(12) United States Patent
Zhang et al.

(10) Patent No.: US 7,980,473 B2
(45) Date of Patent: Jul. 19, 2011

(54) CAMERA BASED CODE READING

(75) Inventors: Chunhui Zhang, Beijing (CN); Shi Han, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 12/039,060

(22) Filed: Feb. 28, 2008

(65) Prior Publication Data

US 2009/0218404 A1    Sep. 3, 2009

(51) Int. Cl.
*G06K 7/10*    (2006.01)

(52) U.S. Cl. .................... 235/462.41; 235/487

(58) Field of Classification Search .......... 235/494, 235/487, 462.04, 462.08, 462.09, 462.1, 235/462.11, 462.23, 462.24, 462.41
See application file for complete search history.

(56) References Cited

U.S. PATENT DOCUMENTS

| | | | |
|---|---|---|---|
| 5,507,527 | A | 4/1996 | Tomioka et al. |
| 5,725,253 | A | 3/1998 | Salive et al. |
| 5,874,718 | A * | 2/1999 | Matsui .......................... 235/494 |
| 6,371,373 | B1 | 4/2002 | Ma et al. |
| 6,983,886 | B2 | 1/2006 | Natsukari et al. |
| 7,143,944 | B2 | 12/2006 | Lapstun et al. |
| 2003/0072489 | A1 | 4/2003 | Reichenbach et al. |
| 2005/0029358 | A1 | 2/2005 | Mankins |
| 2006/0091215 | A1 | 5/2006 | Uchiyama |

FOREIGN PATENT DOCUMENTS

WO    WO0124106 A1    4/2001

OTHER PUBLICATIONS

Gaudin et al., "A Bar Code Location Algorithm Using a Two-Dimensional Approach", found, at <<http://ieeexplore.ieee.org/iel2/3154/8972/00395785.pdf?isNumber=>>, IEEE, 1993, pp. 45-48.
Gils, "Two-Dimensional Dot Codes for Product Identification", found at <<http://ieeexplore.ieee.org/iel5/18/22762/01057351.pdf?isNumber=>>, IEEE, vol. IT-33, No. 5, Sep. 1986, pp. 620-631.
Zuech, "Smart Vision Sensor", retrieved on May 15, 2007, at <<http://www.machinevisiononline.org/public/articles/archivedetails.cfm?id=1748>>, 9 pgs.

* cited by examiner

*Primary Examiner* — Karl D. Frech
(74) *Attorney, Agent, or Firm* — Lee & Hayes, PLLC (57) ABSTRACT

Techniques for providing camera based code reading are disclosed. In some aspects, a camera-readable code is generated which may be read by a code reading device. The code reading device may capture an image of the code, process the image, and decode the code. The code includes symbols arranged to form a pattern. According to one or more embodiments, an image with the code is cropped to remove extraneous information. The code image is manipulated by exact binary segmentation to remove background information from the code. The code is oriented to a grid using an interval value defined between the symbols. The symbols are decoded by comparing unique aspects of the symbols using a statistical analysis. The decoded symbols may be converted to a message for a user or be used for other purposes.

20 Claims, 9 Drawing Sheets

CAMERA BASED CODE READING

BACKGROUND

Bar coding is a generic term for a method of marking an object with a machine readable image that includes information about the object. The term "bar code" is commonly associated with an image that consists of multiple parallel lines (bars) arranged in a row that is commonly printed on labels and used for product identification.

Early bar codes are read by a reading device in a linear fashion (one-dimensional or 1-D) by converting relative line thickness and/or spaces between lines into numeric or character information. The most common use of bar codes is for UPC (Universal Product Code) tagging of objects. An object with a bar code, such as a UPC code, may be scanned by a reading device, which identifies the code and converts it into usable information. For example, the code may be used to retrieve information about the product such as a product description and/or a price. Generally speaking, bar codes require sizable space on the label, include large design constraints, and have information capacity constraints.

Two-dimensional (2-D) bar codes may provide additional information capacity by storing information in a second dimension. 2-D bar codes typically include a fixed border shape (generally rectangular) and are often aesthetically unappealing arrangements of black ink displayed in random abstract representations.

Many products include bar codes that are located in prominent locations on the product, such as on a magazine cover or box of prepackaged cereal. A considerable amount of time and money is spent to enhance the look and appeal of products while maintaining product functionality. In addition to products, many tickets include prominently displayed bar codes, such as tickets for entertainment, travel, or for other purposes.

SUMMARY

This summary is provided to introduce simplified concepts of camera based code reading, which is further described below in the Detailed Description. This summary is not intended to identify essential features of the claimed subject matter, nor is it intended for use in determining the scope of the claimed subject matter.

Exemplary techniques, systems, and implementations for providing camera based code reading are disclosed. According to one or more embodiments, an image with a camera-readable code is captured by a code reading device. The image includes symbols in a pattern. The code may be manipulated to remove extraneous background information. Binary segmentation may be performed to isolate the code contained in the image. An orientation of the code may be determined by intervals defined between the symbols and/or the location of a start identifier and/or a stop identifier in the code. Finally, the code may be decoded by converting recognized symbols into binary data and/or ASCII characters. In at least one other embodiment, the code may be generated in a plurality of pattern designs where the camera based code reader removes extraneous symbols when decoding the code included in the pattern.

BRIEF DESCRIPTION OF THE DRAWINGS

The detailed description is described with reference to the accompanying figures. In the figures, the left-most digit(s) of a reference number identifies the figure in which the reference number first appears. The same reference number in different figures refers to similar or identical items.

FIGS. 8*a* and 8*b* show illustrative flow diagrams of at least one embodiment of camera based code reading, and more specifically.

DETAILED DESCRIPTION

An improved code design and operation may be advantageous by providing aesthetic appeal, removing pattern design constraints, improving information capacity, and for other reasons disclosed herein. Many specific details of embodiments of the disclosure are provided in the following description and in FIGS. 1 through 9. One skilled in the art, however, will understand that the present disclosure is not exhaustive and may have additional embodiments, or that the present disclosure may be practiced without several of the details described in the following description.

Figure 1:
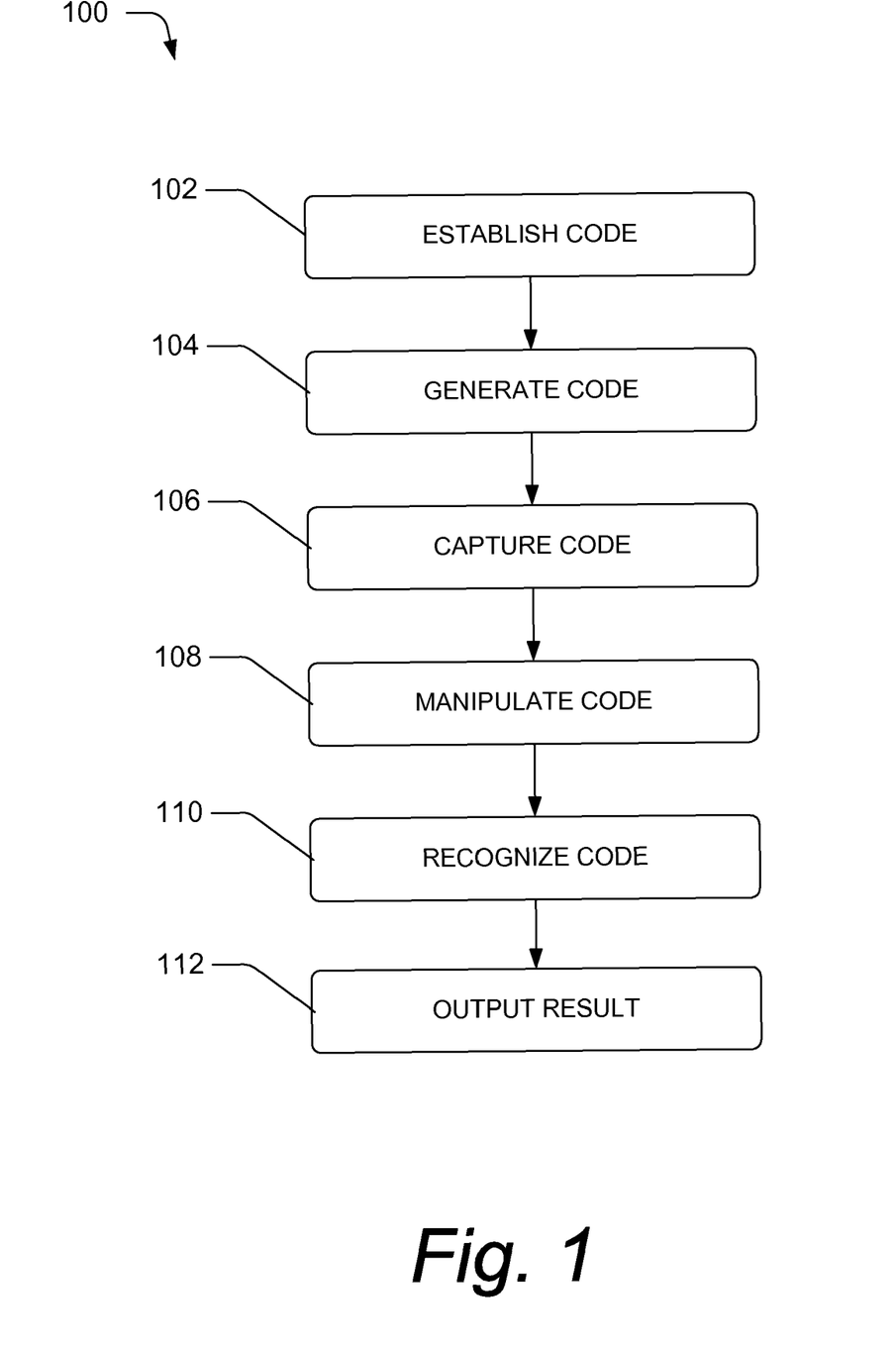
FIG. 1 shows an illustrative flow diagram of at least one embodiment of camera-readable code presentation and reading.

FIG. 1 shows an illustrative flow diagram of at least one embodiment of a process 100 of camera-readable code presentation and reading. The process 100 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described through this disclosure, in addition to process 100, shall be interpreted accordingly.

As shown in FIG. 1, a camera-readable code is established at 102. The code may be an arrangement of symbols (e.g., shapes, icons, etc) that enable a transfer of information based on the symbol's occurrence and position which may be detected by a reading device. Once the code is established, an instance of the code is generated at 104 to associate information with an object. For example, the code is printed on a label that is applied to an item of merchandise which is ultimately offered for sale.

The code may be captured at 106 by a device capable of reading the code, which in turn creates an image of the code. In one or more embodiments, the device may be a camera such as a digital camera, camera phone, or web camera that is in communication with a server. The code image may be manipulated at 108 to improve aspects of the image and locate, orient, clarify, among other possible manipulations, the camera image for further processing. At 110, the image code may be analyzed and recognized, as further described herein to determine each symbol in the code image. Finally, a decoded message or other output may be generated by the analyzed code at 112. For example, the symbols may represent bits, which are converted to ASCII (American Standard Code for Information Interchange) characters or other character formats to display a message.

The following sections of the detailed description provide more detail of the blocks included in process 100. A first section entitled "Illustrative Design" discloses at least some embodiments of code designs. The next section entitled "Illustrative Operation" discloses at least some embodiments of processes of extracting information from an image of a code created using the Illustrative Design. Finally, an "Illustrative System" is presented for implementing camera based code reading.

Illustrative Design

Figure 2A:
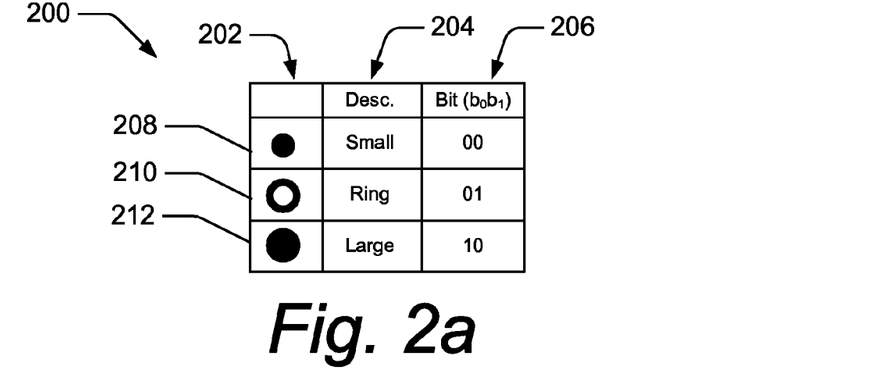
FIGS. 2*a*, 2*b*, and 2*c* show illustrative symbols of at least one embodiment that may be generated for a capture and/or decode process by a camera based code reader.

FIGS. 2a, 2b, and 2c show illustrative symbols of at least one embodiment that may be generated for a capture and/or decode process by a camera based code reader. FIG. 2a shows a table 200 of illustrative symbols 202, including a description 204 and a bit value 206. In one or more embodiments, the illustrative symbols 202 include a small dot 208, a ring 210, and a large dot 212. As shown in FIG. 2a, the illustrative symbols 202 are generally circular. According to other embodiments, the symbols may be squares, triangles, polygons, or other shapes, in various combinations depending upon code design preferences. However, solely for discussion purposes and consistency throughout the disclosure, techniques for implementing camera based code reading will be disclosed with reference to the symbols 202 including the small dot 208, the ring 210, and the large dot 212.

Figure 2B:
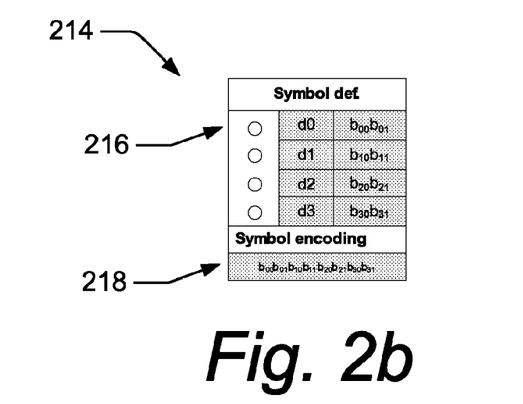

FIG. 2b includes an illustrative table 214 showing a representative listing of symbols having an associated bit definition. For example, a first row of table 214 depicts a symbol with a first bit definition having a two bit value. The entire table shows four different bit definitions, which may be combined to create a symbol encoding 218. The table 214 may be derived by a code designer using the techniques described herein. In one or more embodiments, an eight bit code may be generated from four symbols, thus enabling up to 256 unique combinations (i.e., $2^8=4^4=256$). In an embodiment, the symbols may generate three unique variations for a two bit value, thus resulting in 81 unique combinations (i.e., $3^4=81$) when four symbols are combined to create the symbol encoding 218. Other embodiments may use more or fewer symbols to create the symbol encoding 218, while still further embodiments may include symbols with more or fewer bit representations, such as by including a fourth symbol with a bit value ($b_0 b_1$) of 11.

Figure 2C:
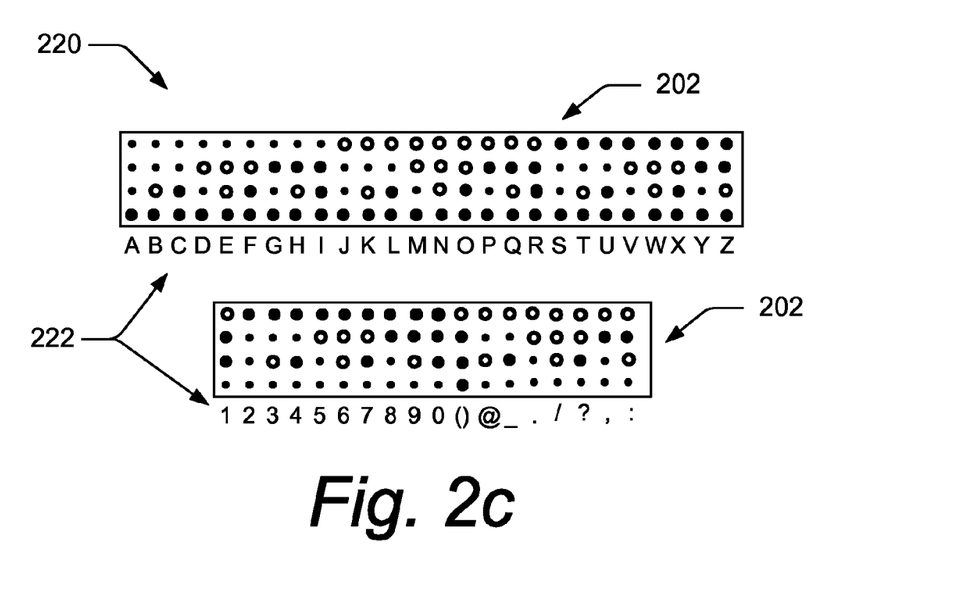

FIG. 2c shows an illustrative table 220 including at least a portion of characters 222 (e.g., ASCII characters) associated with groupings of the symbols 202. One of ordinary skill in the art can appreciate that the symbol encoding 218 may be converted to the characters 222. For example, a partial listing of ASCII characters may populate some or all of the possible 81 unique variations created by a series of four of the illustrative symbols 202 as shown in table 214. In one or more embodiments, the symbols 202 may be converted to binary data that is then associated with an ASCII character, such as the ASCII characters 222 represented in the table 220. The table 220 may be derived by a code designer to enable conversion from a symbol to a character.

Figure 3A:
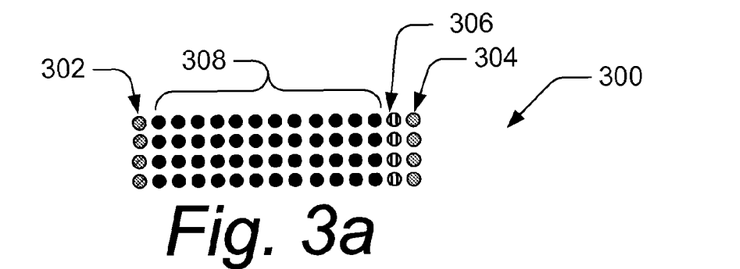
FIGS. 3*a*, 3*b*, 3*c* and 3*d* show illustrative patterns of symbols of at least one embodiment which may be used to extract information.

FIGS. 3a, 3b, 3c and 3d show illustrative patterns of symbols of at least one embodiment which may be used to extract information. In FIG. 3a, a pattern 300 of symbols may be arranged in four rows. The arrangement may be determined by a set of established rules, such as rules created by a code designer. A first column may be designated as a start column 302 while a last column may be designated as an end column 304. The start column 302 and the end column 304 may include unique symbol encoding which indicate to a reader that a column is the start column or the end column, respectively. In addition, the pattern may include an error checking column 306. The error checking column 306 may be compared to an arrangement of the symbols in a body 308 of the pattern to ensure that a code is properly read by a device. Algorithms for error checking are well known in the art and widely used to validate a series of numbers or textual information.

In one or more embodiments, the symbols 202 may be reproduced in black ink, in grayscale, or in colors while maintaining a representative shape, such as the shape depicted and described in relation to table 200. In addition or alternatively, some embodiments may include patterns having different configurations, such at the patterns associated with FIGS. 3b, 3c, and 3d.

Figure 3B:
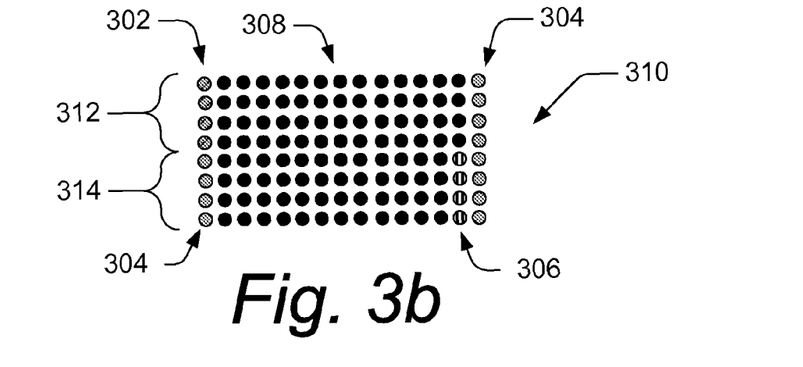
Figure 3C:
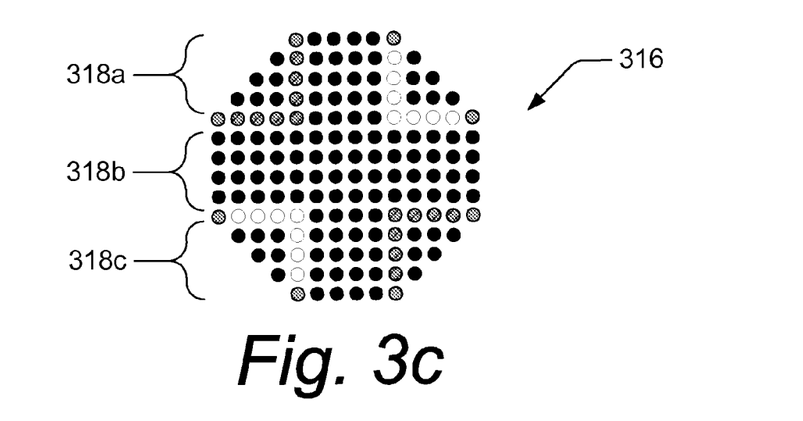
Figure 3D:
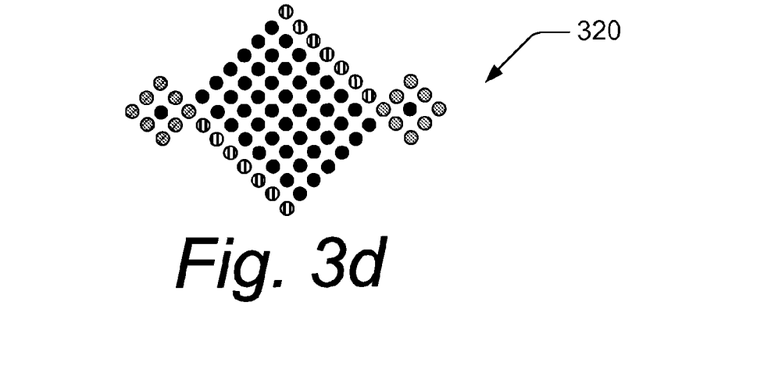

FIG. 3b shows an illustrative pattern 310 having a first portion 312 and a second portion 314. Each portion may include one or more instances of the start column 302, the end column 304, and/or the error checking column 306. The body 308 may begin on the first portion 310 and continue along the second portion 312, or vice versa. FIG. 3c shows another illustrative pattern 316 having multiple portions 318a, 318b, and 318c. In one or more embodiments, the pattern may be generated by placing the symbols 202 in a particular arrangement for information extraction, such as by reading the symbols at the first portion 318a before reading the symbols at the second portion 318b. In some embodiments, the start column 302 may indicate which of the portions is read first, thus determining the read orientation of the pattern. In addition or alternatively, the symbols may be arranged in many different patterns without reconfiguring a reading device and/or algorithm. For example, the location of the start column 302, the end column 304, and other orientation designators (listing of symbols that direct the reader) may be used to enable reading symbols in a multitude of patterns. FIG. 3d shows yet another illustrative pattern 320 that may be used to display symbols for reading by a device while providing an aesthetic appearance to a consumer or other person.

Figure 4A:
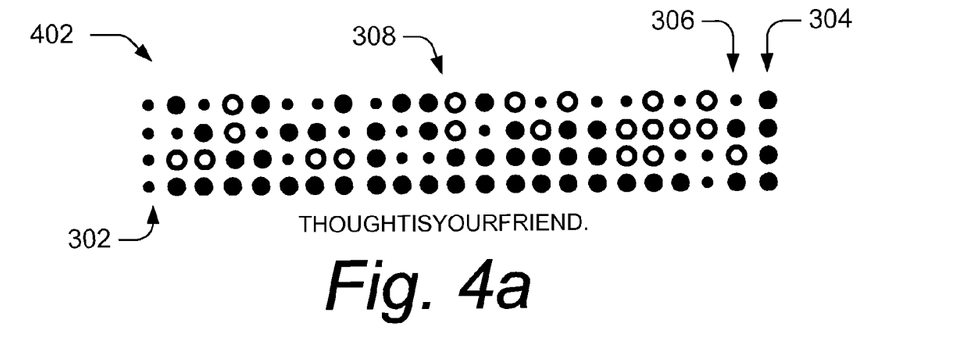
FIGS. 4*a* and 4*b* show examples of encoded patterns of symbols in accordance with at least one embodiment.

FIGS. 4a and 4b show examples of encoded patterns of symbols in accordance with at least one embodiment. For example, the code 402 in FIG. 4a may correspond to the pattern 300 that is presented in FIG. 3a. The code 402 may contain a message using ASCII characters such as "xbox360isyourfriend," based on the symbols arranged in the body 308 of the pattern. In addition, the code 402 may include the start column 302, end column 304, and/or error checking column 306.

Figure 4B:
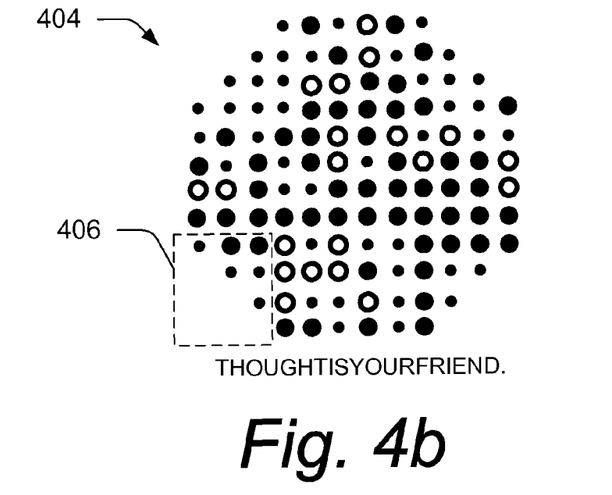

FIG. 4b shows a code 404 that may correspond to the pattern in FIG. 3c. The code 404 may also be decoded to display a message such as "xbox360isyourfriend." As illustrated in FIG. 4b, the code is read from groupings of four rows, starting at the top and reading left to right and top to bottom, similar to the arrangement of text in a book written in English. When decoding the symbols in the pattern, which will be described in further detail in the subsequent section, columns with fewer than four rows (or other establish row count) may be disregarded, such as section 406. Although FIGS. 4a and 4b are illustrated as being read (or decoded) from left to right and top to bottom (regarding FIG. 4b), other arrangements of the symbols are contemplated such as symbols arranged to be read right to left and/or bottom to top. For example, in some instances it may be advantageous to create symbols which would be difficult to decode without the assistance of a device employing a decoding algorithm, such as to reduce the possibility of counterfeiting.

Figure 4C:
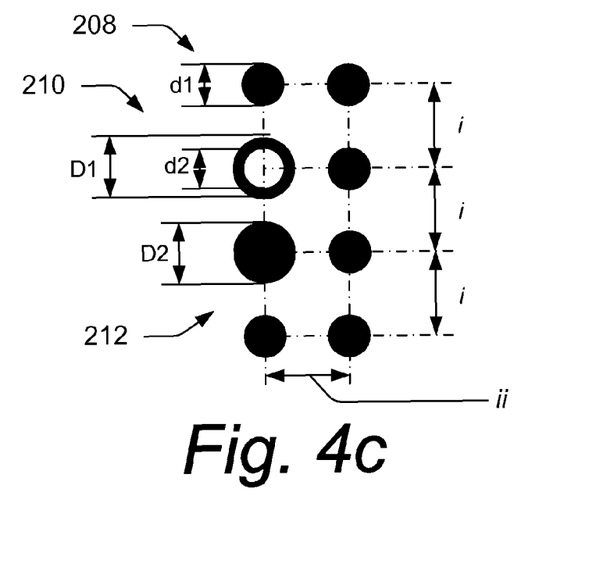
FIG. 4*c* shows an illustrative symbol geometry of at least one embodiment of camera based code reading.

FIG. 4c shows an illustrative symbol geometry of at least one embodiment of camera based code reading. As discussed above, the pattern may include columns of symbols that may be decoded to ASCII characters. In an embodiment, an interval between the elements may be consistent in at least one direction. A pattern, such as pattern 316 in FIG. 3c, includes the interval i along a first direction and as second interval ii along a second direction that is perpendicular to the first direction. In one or more embodiments, the first interval i and the second interval ii may be distinguishable in distance thus enabling unique identification of an axis based on the interval for the axis. The intervals create a uniform grid that includes symbols at each intersection of rows and columns, each spaced apart by the interval associated with the respective axis. In addition, the small dot 208 may have a diameter of d1; the ring 210 may have an outer diameter of D1 and an inner diameter of d2; and the large dot 212 may have a diameter of D2. In some embodiments, d1 may be substantially equal to d2 and/or D1 may be substantially equal to D2. The symbols 202 may be generated in a variety of sizes. However, the size may be constrained by factors such as the resolution of the reading device (e.g., digital camera), the capabilities of the printing device (e.g., code printer resolution), or other design considerations. For example, when symbols are printed on a label of a can, they may be relatively small, but when they are painted on an exterior of a railroad car, the symbols may be relatively large.

Illustrative Operation

Once the code design has been determined, a technique, process, or method for decoding a pattern of symbols must be created to decode the symbols to extract useful information. In one or more embodiments, decoding the pattern of symbols may be performed locally and/or remotely, using one or more of a computing device, a server, and/or a reading device (e.g., a camera). For example, a code may be transmitted to a remote server farm for processing (decoding). A decoded message may be transmitted from the server to a recipient that desires the decoded message.

Figure 5:
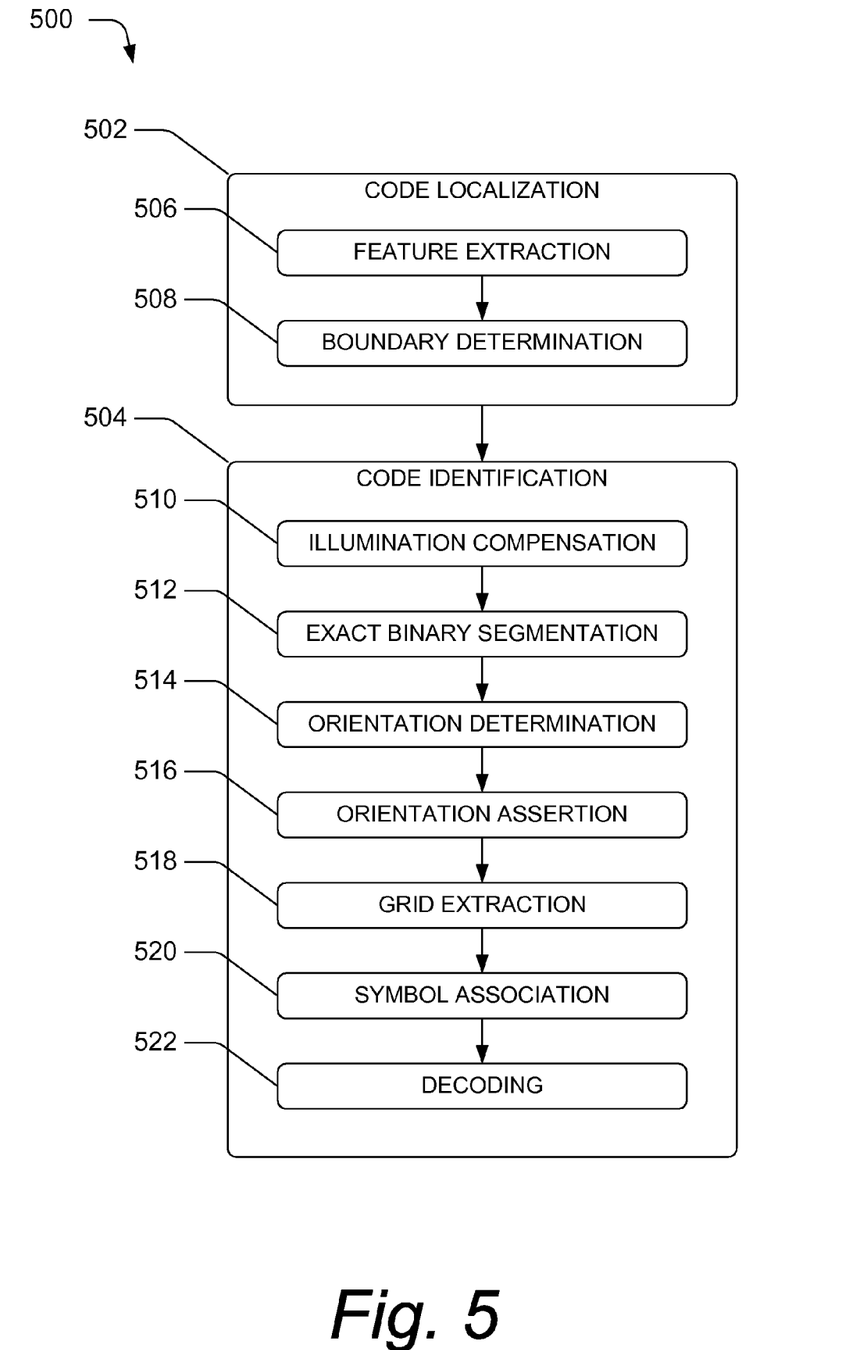
FIG. 5 shows a flow diagram of at least one embodiment of an illustrative process of camera based code reading.

FIG. 5 shows a flow diagram of at least one embodiment of an illustrative process 500 of camera based code reading. The process 500 may be implemented in hardware and/or software to perform the techniques, processes, or methods described herein. The process 500 may include code localization at 502. Code localization may include manipulation of an image prior to a code identification process. For example, an image may be captured that includes a camera-readable code among other objects, such as a background, text, or other image details. In one or more embodiments of code localization, a code located in an image is cropped to maintain the code and remove extraneous information, such as extra background included in the image. In addition or alternatively, the process 500 may include code identification at 504, which may include additional processes for extracting a message from the camera-readable code. The process for extracting a message may range from filtering the image of the code to recognizing individual symbols in the code to extract the message.

The code localization at 502 may include a series of sub-processes that manipulate the image. At 506, a feature extraction process may be performed to distinguish the code from the background in an image. Next, a boundary determination process may determine the boundary of the code within the image at 508. The boundary determination may allow the image to be cropped to exclude unnecessary extraneous background, thus leaving the code in the preserved portion of the image.

The code identification at 504 may also include a series of sub-processes that extract a message from the code. At 510, the image may undergo illumination compensation, which may be used to adjust the color balance across the code. For example, when a code is captured by a camera, the image may capture shadows or varying degrees of lighting dispersed across the code. The image may have a relatively light background on a first side and transition to a darker background on a second side of the image based on lighting or other factors even though the actual code (e.g., printed code) may have a consistent background color, such as a white background. An exact binary segmentation may be performed on the image at 512, which may include locating the position of symbols in the code and obtaining the binary segmentation of the symbols at these locations.

At 514, the image is analyzed to determine the orientation of the code. In some embodiments, the orientation is calculated with a fast Fourier transform (FFT). Next, the image may undergo an orientation assertion at 516, which may determine the main orientation of the code the direction the code is read by a reading device. In some embodiments, the intervals (i, ii) as described in relation to FIG. 4c may have different values. A longer interval may indicate a main axis, which may be used to designate the main orientation of the code. The orientation calculated by the FFT should be the same as the main orientation, but in some instances may be identical to the perpendicular orientation (having the shorter interval). The moment may be used to calculate an approximate main direction as an assertion. The result by moment may not result in an exact orientation, but it may be close enough to enable ultimate success in decoding the message. In such an instance, the direction identical to the moment result is designated as the main orientation.

At 518, a grid extraction process may be performed on the image. In one or more embodiments, the grid extraction may identify an oriented matrix for each symbol of the code. Each symbol may be localized during this process, even when distortions exist such as affine distortion and perspective distortion. Next, the image may be analyzed for symbol association at 520. Symbol association may include symbol extraction and symbol recognition using details of the symbols. For example, the symbols 202 in FIG. 2 are uniquely identifiable using a manipulation of variables such as area, boundary length, and distribution variance. Finally, the symbols may be decoded at 522. In some embodiments, the symbols may be converted to binary code, such as the symbol encoding 218 in FIG. 2. The binary code may be converted to ASCII characters or other message characters to output a message. Alternatively or additionally, the binary code may be manipulated by the device for other purposes, such as to determine product information associated with a product UPC (Universal Product Code), such as when a coded product is read during a transaction at a grocery store. In further embodiments, the symbols may be converted directly to ASCII characters or other message characters to output the message.

Figure 6:
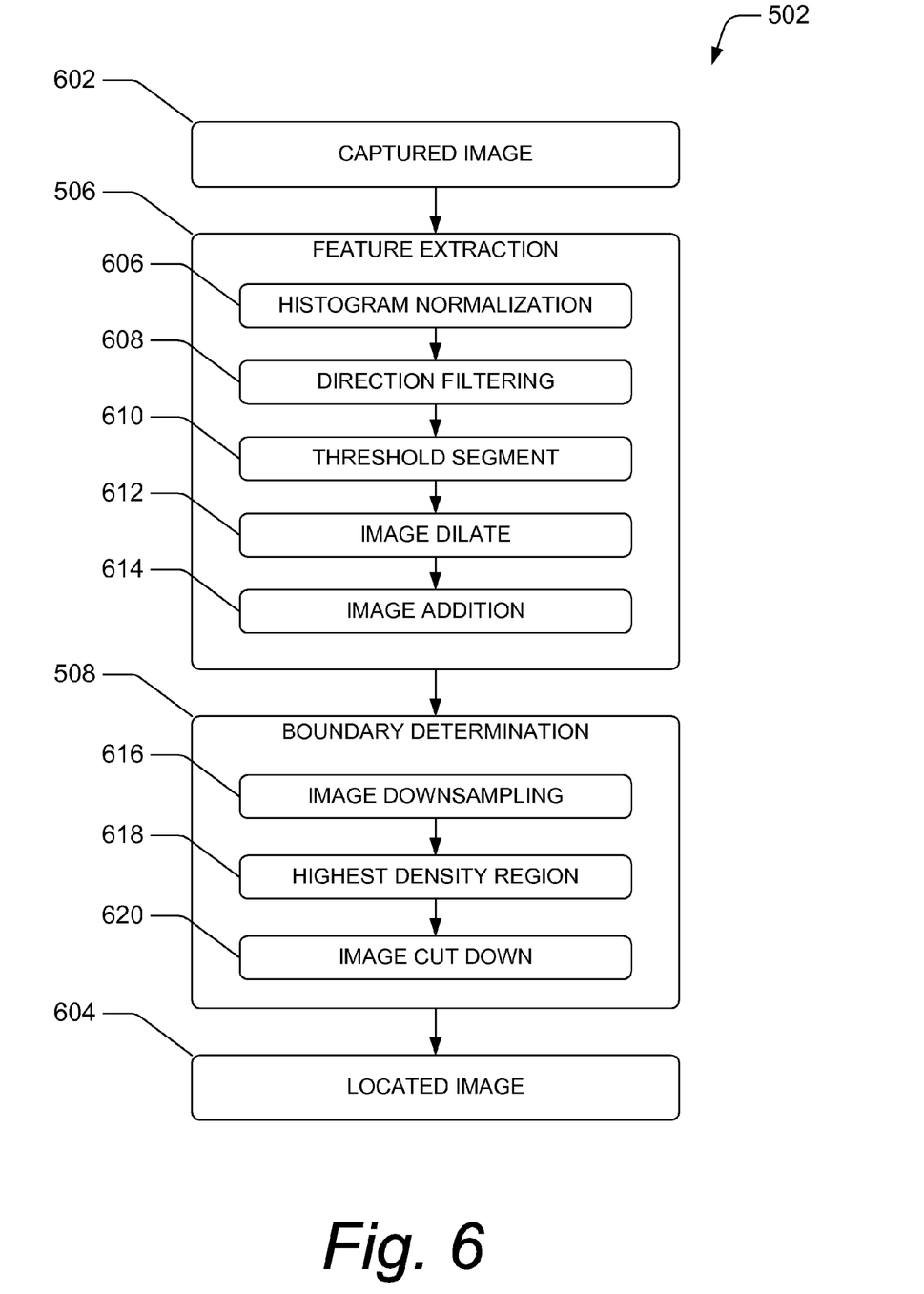
FIG. 6 shows an illustrative flow diagram of at least one embodiment of code localization.

FIG. 6 shows an illustrative flow diagram of at least one embodiment of code localization as initially described at 502 in FIG. 5. The code localization begins with a captured image at 602 and ends with a located image at 604. The image may be captured by a camera, such as a digital camera. In some instances the camera may be located proximate the code representation, such as when using a camera based code reader which does not include an optical zoom lens and/or high quality resolution capabilities. In one or more embodiments, the camera based code reader may include a camera with an optical zoom lens and/or high quality resolution capability, thus enabling the camera to be placed a significant distance from the code representation while still enabling accurate decoding. Other factors, such as the size of the symbols and lighting condition, among other possible factors, may further influence the location of the camera based code reader, optical zoom lens requirements, and resolution requirements.

At 506, the feature extraction may be performed on the image using one or more sub-processes. In some embodiments, the feature extraction may include a histogram normalization process at 606. The histogram normalization may optimize the image visual effect by adjusting the contrast in portions of the image. The histogram boundaries may be set by locating the one percent levels to 0 and 255, thus black and white parts become easier to distinguish. At 608, orientation information is detected in four directions corresponding to angles 0, 45, 90, and 135 for a directional filtering process. Other embodiments may include more or fewer angles and/or angles having different degrees. The histogram normalized image is convoluted with the directional convolution kernels (filter), such as those listed below:

$$k0 = \begin{bmatrix} 0 & 0 & 0 \\ 1 & 0 & -1 \\ 0 & 0 & 0 \end{bmatrix}$$

$$k45 = \begin{bmatrix} 0 & 0 & -1 \\ 0 & 0 & 0 \\ 1 & 0 & 0 \end{bmatrix}$$

$$k90 = \begin{bmatrix} 0 & -1 & 0 \\ 0 & 0 & 0 \\ 0 & 1 & 0 \end{bmatrix}$$

$$k135 = \begin{bmatrix} -1 & 0 & 0 \\ 0 & 0 & 0 \\ 0 & 0 & 1 \end{bmatrix}$$

Next, iterative threshold segmentation is applied to each of the directional convolution kernals (e.g., k0, k45, k90, and k135) at 610 to turn gray portions (or otherwise shaded, colored, etc.) of the image to a binary edge. The iteration may stop when the difference between a new threshold and an old threshold is less than a predetermined value, such as five pixels. In one or more embodiments, background noise may be reduced by multiplying the threshold by a filter value, such as 0.4, determined by a code designer. For example, the filter value may be adjusted by a designer based on resulting noise reduction results. Each symbol shape may stay around its original position in each threshold segmentation image after directional filtering has occurred. At 612, reverse dilate process is applied to each of the directional convolution kernals (e.g., k0, k45, k90, and k135) in each direction which may result in the symbol shape edge crossing the symbol center. Finally, at 614, the image addition may combine aspects of the four (or other number of image manipulations) to extract the symbol features from the image and remove the majority of the background.

At 508, the boundary determination may be performed on the image using one or more sub-processes. Image downsampling may be applied at 616. In some embodiments, the symbol feature may be sampled at a sampling pixel interval, such as at an interval of 8 pixels. Each sampling point counts symbol density with a width of about 16 pixels (e.g., for an interval of 8 pixels). For example, in the above example at 640×480, the original image may be downsampled to 80×60.

The highest density region is located at 618. Generally speaking, the symbol code is composed of many dots when the code is produced on a fixed medium. The highest dot density is located inside a code region (i.e., boundary), set as (center-x, center-y). The symbol code region may be achieved by neighborhood searching around the highest dot density point (center-x, center-y). The minimum x and minimum y points may be set at the top left corner, the maximum x and maximum y points may be set as the bottom right corner. A border may be added to edge of the symbol code, such as a border of 0.05 mm or a fixed percent in pixels, etc. to include a buffer so that the symbol code is distinguishable from any remaining background noise. At 620, the image may be cut down (i.e., cropped) based on the coordinates located from the boundary determination.

Figure 7:
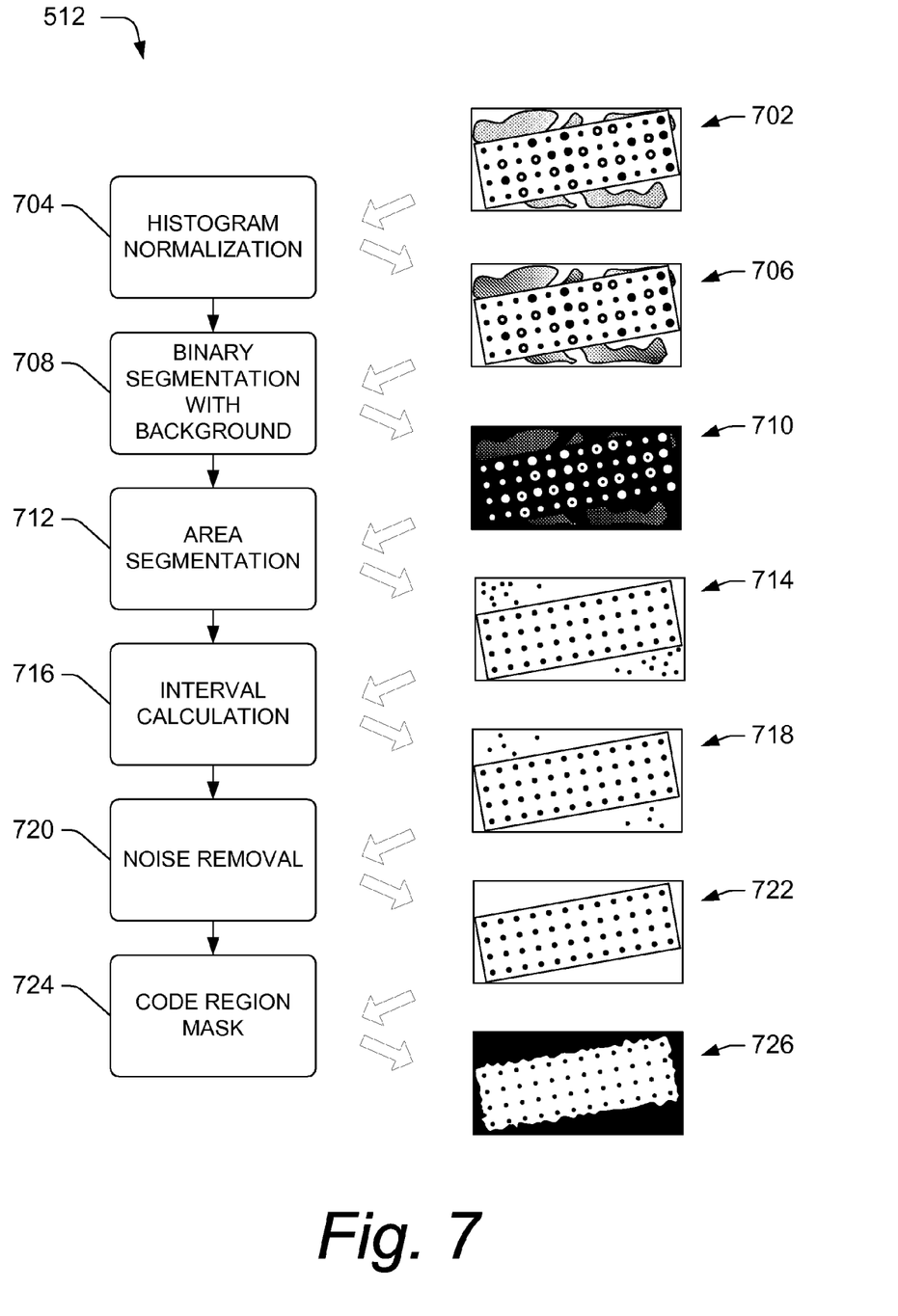
FIG. 7 shows an illustrative flow diagram of at least one embodiment of exact binary segmentation.

FIG. 7 shows an illustrative flow diagram of at least one embodiment of a process of exact binary segmentation as illustrated at 512. The exact binary segmentation process begins with a raw image 702. At 704, histogram normalization may be used to increase the dynamic grey level scale of the interested (code) region in the raw image 702 to create a first modified image 706 which is still a grey level image, but includes more contrast than the raw image 702. The histogram normalization may improve the contrast of the raw image 702 and also obtain the normalized gray level distribution, which is relatively stable among different images.

At 708, the first modified image undergoes binary segmentation with background to create a second modified image 710. The binary segmentation is based on an image processing algorithm "image binarization" or "thresholding." This process marks each pixel in the image as either an object or background for images that have different object and/or background color or grey level distributions. In some embodiments, the object (code) is darker and the background is brighter. A grey level threshold T is determined to classify the object and the background, where threshold T is determined in an iterative approach. For example, T may be set to $T_0$ as a global mean (or median) grey level. This results in two grey level distributions for the object pixels and background pixels, respectively. Based on these tow distributions, the threshold T is adjusted for $T_0$ to $T_1$, and the iteration is continued until the threshold is stable. The second modified 710 image includes reduced background presence as a result of the binary segmentation.

At 712, area segmentation is preformed on the second modified image 710. According to one or more embodiments using generally circular symbols, the circles are single connected areas. The area segmentation extracts the connected areas that make up the symbols, as well as the connected areas of the background, each area having a center of gravity point. The resulting image 714 depicts the center of gravity point of each connected area. Any areas of remaining background will also have a center of gravity point. At 716, an interval calculation is obtained using a statistical model. In some embodiments, the interval is measured between the center of gravity point of the symbols and the lowest and highest interval values are disregarded. For example, the lowest and highest twenty percent intervals may be disregarded, thus leaving the remaining sixty percent to be used to calculate an average interval. An image 718 shows the symbol center of gravity points with the average interval.

At 720, noise is removed from the image 718. Noise may exist as a result of lingering background colorization. The noise may exist because the background is complex (outer noise) and/or because different parts of a broken symbol create noise (inner noise). Outer noise and inner noise may be removed using the symbol interval calculation discussed above to create the image 722. For example, imagery not in the interval may be removed. Finally, a code region mask may be applied at 724 which may be determined by area growing and connected region segmentation. The mask is used for the exact binary segmentation and is shown in image 726.

Figure 8A:
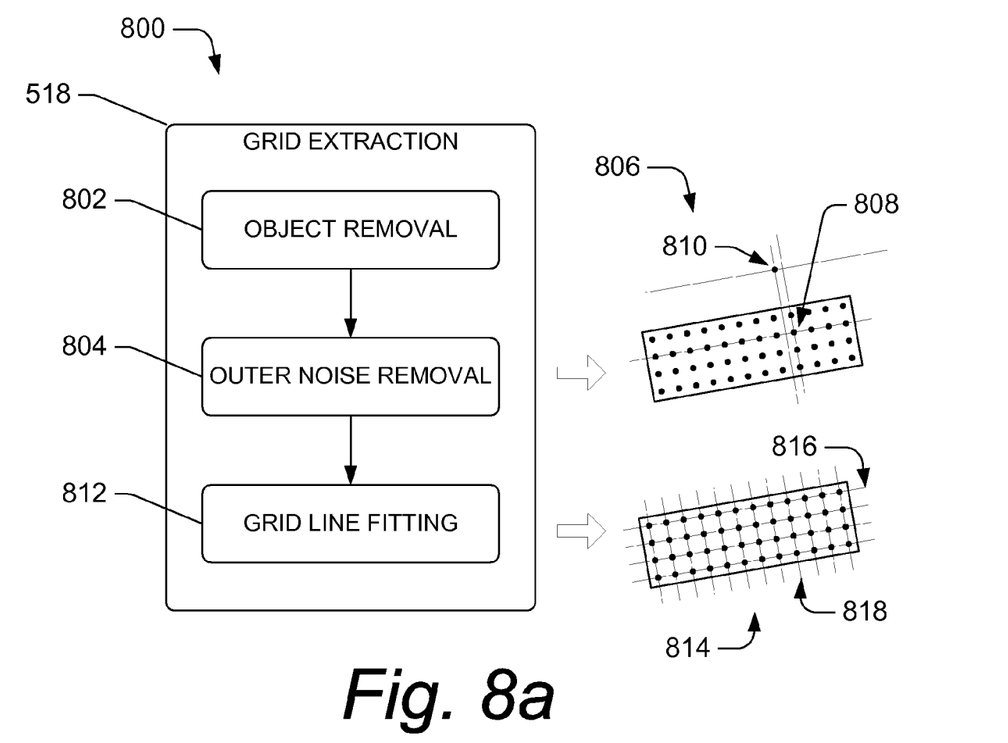
FIG. 8*a* shows an illustrative process of grid extraction and FIG. 8*b* shows an illustrative process of symbol association.

FIG. 8*a* shows an illustrative process of grid extraction. The patterns, such as patterns 300, 310, 316, and 320 (referring to FIG. 3) are all substantially oriented in a matrix. For illustrative purposes, a matrix with a 90 degree angle between rows and columns is presented, however matrices with other orientations may also be used to implement embodiments of the present disclosure. In one or more embodiments, each symbol lies at a crossing point of a matrix grid. The symbols may be localized at every point in the grid by determining a grid extraction, even when capture distortions and perspective distortion exist. To begin the grid extraction, another noise removal process is performed to obtain refined information for the image.

At 802, an object removal process is performed on the image. This process refines the inner noise. In some instances, printing and/or imaging may cause the symbols to have broken or disconnected parts so that some inner noise appears. First, the symbols are removed in an open operation. The range of the open operation is calculated according to the interval (previously calculated and described above) and the pattern design. The open operation removes the symbols with open areas, such as ring symbols and reserves closed symbols, such as the dot symbols.

At 804, outer noise may be removed using the grid information. For each dot (gravity) position, two perpendicular axes may be created which cross at the dot as shown in image 806. For symbol positions 808, the sum of dots on two axes equals the sum of rows and columns in the pattern design. In addition, the dots distribution is regular, which means they have almost equal intervals and the variance is more than a fixed amount. However, for noise positions 810, no correlation with dot sums exists or with a fixed interval, thus making them easy to identify and subsequently remove from the image.

According to one or more embodiments of the disclosure, grid line fitting may be used at 812 to ultimately identify the symbols on a grid-fit image 814. A kernel algorithm of grid line fitting may be based on the common Least Square fitting. This is an iterative method having two key parameters e and s, and the previously discussed interval i. The grid fitting is preformed in a main orientation 816 and a perspective direction 818, respectively. In each instance, the symbols are projected to the orientation axis to sort the coordinates. From a first end, each clustered symbol group is treated as a grid line. The product of s and i is the threshold to identify distinct adjacent dot groups, as shown in Equation 1. For prospective distortion, the axis orientation is recalculated after each line fitting and the remaining dots are also re-projected and resorted.

$$\text{threshold} = s \cdot i \quad \quad \text{Equation 1}$$

During each iteration, the least square fitting is preformed and an error calculation is performed. The symbol position which causes the most error in the iterations is selected as the noise position, and then is subsequently removed. The iteration stops when the error (E) is less than the resultant of Equation 2 below, where n is the number of dots along the line, and e is a predetermined error factor.

$$E < n \cdot e \cdot i^2 \quad \quad \text{Equation 2}$$

In some embodiments, the grid extraction process in 518 may determine a read start position for decoding the camera-readable code. For example, in FIG. 3*b*, a pattern 310 includes eight rows of symbols. In embodiments where four rows of symbols represent a character, the pattern 310 includes two portions of code. Identification of arrangements of the code among a pattern may enable various patterns designs to be decoded with a single decoding algorithm. The ability to provide flexibility in pattern design may be advantageous to allow users, such as manufactures, advertisers, or others to customize the pattern for a specific instance of a code. For example, a user may create a decorative code that is shaped like a baseball bat for a baseball admission ticket or a pattern resembling a soft drink and popcorn may be used for an admission ticket to a movie.

Once the main orientation 816 and the perspective direction 818 are determined, as described above, additional information may be used to determine the flow of the symbols for decoding. In some embodiments, a start position may be determined by a sequence of symbols as the start code 302. Other symbols may be disregarded during a decoding of the symbols, such as symbols that do not align to the grid. In other embodiments, symbols that do not meet a predetermined line counts (symbols per column) may be disregarded, such as the symbols shown in the section 406 in FIG. 4*b*. This may allow a wave-shaped pattern or octagon shaped pattern to be read similar to a rectangular pattern because extraneous symbols that form the wave effect or the edge of the octagon may be disregarded, thus effectively trimming them from the code pattern. Therefore, the use of grid extraction, and other aspects of the symbol arrangement within a pattern, may enable an expanded selection of code patterns with many possible reading configurations.

Figure 8B:
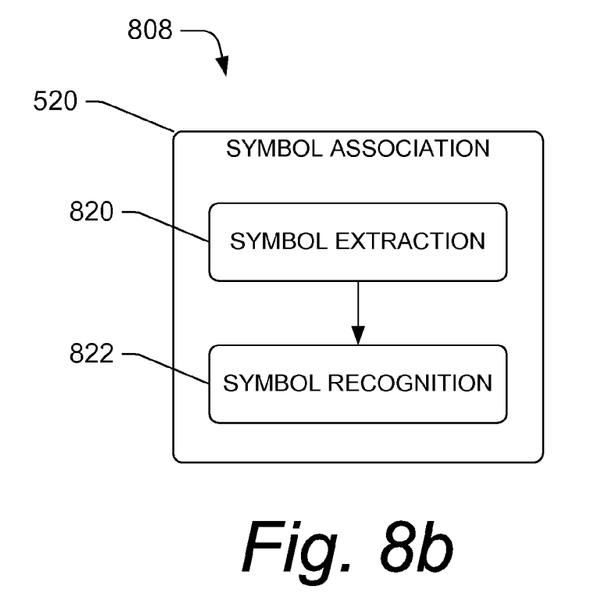

FIG. 8*b* shows an illustrative process of symbol association. Once the symbol location is identified, such as by determining the grid calculation as previously described, the symbols may be detected at each valid crossing position of grid lines. At 820, the symbol is extracted. The size of a single symbol may be determined for each location on the grid. For example, at a valid crossing position, the oriented image block of the symbol may be obtained with a predetermined tolerance. Next, binary segmentation and connected region segmentation may be preformed in turn. The largest connected area is considered as the front part of the symbol, which is retained for further processing.

At 822, three main features are selected to support the recognition of the symbol. The three features include area (A), boundary length (B), and distribution variance (S). As shown below in Table 1, each unique symbol may be identified by combinations of A, B, and S, where in an embodiment, $R_L = 4$ mm, $R_C = 4$ mm, $R_S = 2.8$ mm, and $r_C = 2.5$ mm.

TABLE 1

| Description | Area (A) | Boundary Length (B) | Distribution Variance (S) | B * S | A * B * S |
|---|---|---|---|---|---|
| Small | $\pi R_S^2$ | $2\pi R_S$ | $R_S^2/2$ | $21.952\,\pi$ | $172\,\pi^2$ |
| Ring | $\pi(R_C^2 - r_C^2)$ | $2\pi(R_C + r_C)$ | $(R_C^2 + r_C^2)/2$ | $144.625\,\pi$ | $1410\,\pi^2$ |
| Large | $\pi R_L^2$ | $2\pi R_L$ | $R_L^2/2$ | $64\,\pi$ | $1024\,\pi^2$ |

For example, the product of B and S may allow identification of ring symbols while the product of A, B, and S may distinguish between small circles and large circles.

In some instances, the image may be captured from a long distance which results in a smaller effective area for the code region. If the camera resolution is not high enough, each dot symbol is expressed in only a few pixels. In this case, the distinction of B*S feature between dot types is relatively small. In addition, the front part of ring symbols may also be brighter, which means the contrast in a ring symbol region is reduced. This feature may be exploited to accommodate the instance of image capture from a long distance. For example, let g1 and g2 be the two gray level peaks in the binary segmentation process.

$$P = \frac{1}{g2 - g1} \qquad \text{Equation 3}$$

As shown in Equation 3, a value P may be calculated to obtain another feature of the symbols. The combination of P, B, and S may enable a distinction between ring symbols from the other symbols. The product of P, B, and S (PBS) is almost equivalent to the product of B and S in the near distance situation, thus PBS is used in the long distance situation to distinguish between symbols and create accurate symbol recognition.

According to one or more embodiments of the disclosure, classification techniques are used in pattern recognition. First, all the symbols are classified into two categories according to PBS, and the ones with larger values are recognized as ring symbols. Next, the remaining dots are classified into small circles and large circles according to the ABS value. The values of PBS and ABS may be plotted to create clusters of data points, each cluster representing a different and unique symbol.

Exemplary System

Figure 9:
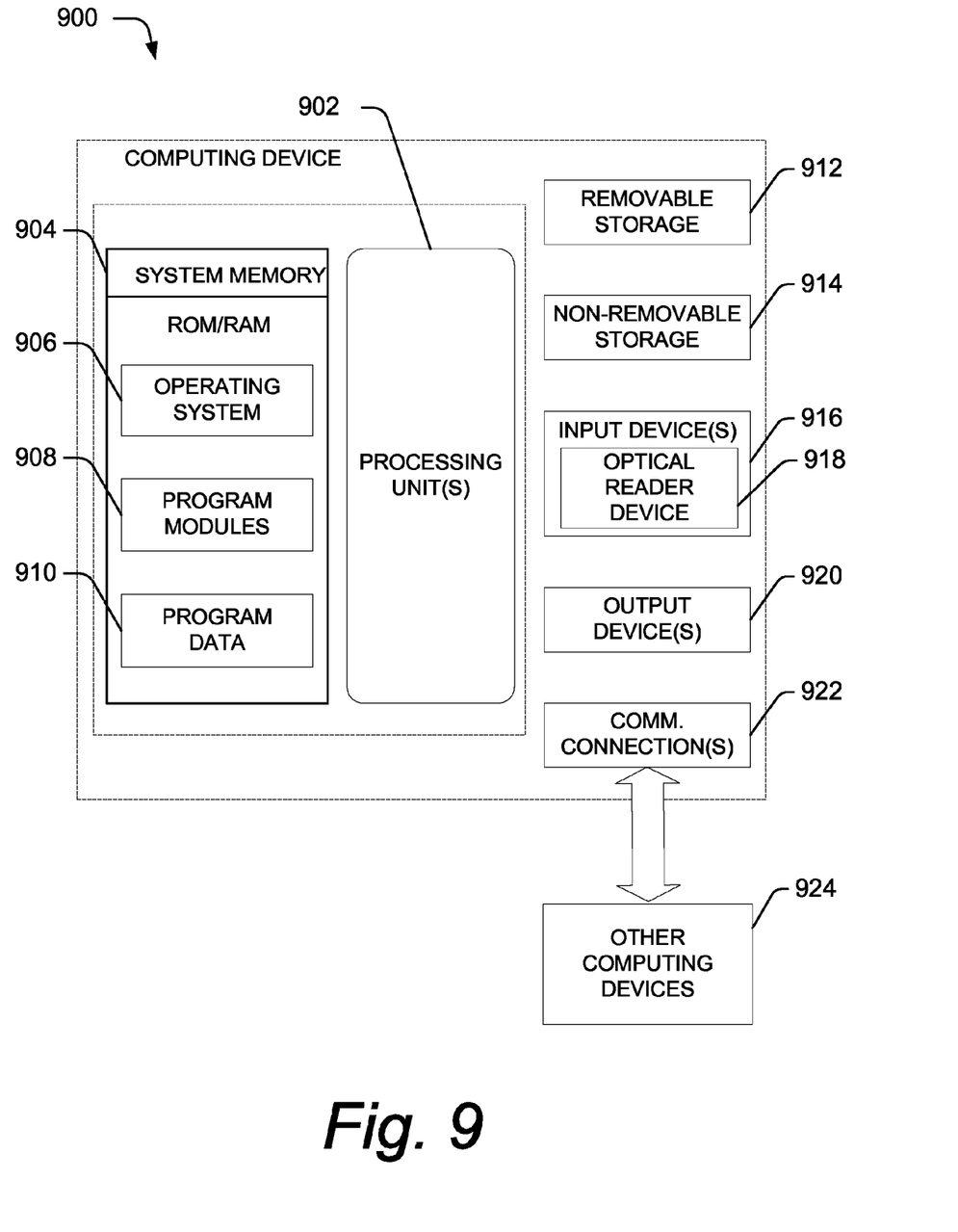
FIG. 9 is an illustrative computing device that may be used to implement the techniques and mechanisms described herein.

FIG. 9 illustrates one exemplary system for implementing camera based code reading. The system includes a computing device, such as computing device 900. In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 906, one or more program modules 908, and may include program data 910.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 912 and non-removable storage 914. Computer storage media may include volatile and nonvolatile, removable and non-removable media implemented in any method or technology for storage of information, such as computer readable instructions, data structures, program modules, or other data. System memory 904, removable storage 912 and non-removable storage 914 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 916 such as keyboard, mouse, pen, voice input device, touch input device, etc. One particular input device may be an optical input device 918 (e.g., a camera, scanner, etc.). Output device(s) 920 such as a display, speakers, printer, etc. may also be included.

Computing device 900 may also contain communication connections 922 that allow the device to communicate with other computing devices 924, such as over a network. Communication connection(s) 922 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

CONCLUSION

The above-described techniques (e.g., methods, devices, systems, etc.) pertain to camera based code reading. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of reading a code, comprising:
acquiring an image of the code, the code having a boundary circumscribing a pattern of generally circular symbols;
adjusting the image of the code to enhance recognition of the code;
orienting the code with respect to the image;
extracting a grid through oriented symbols in the code; and
decoding the symbols at each grid location, the decoding including comparing a group of the symbols to an error checking column of symbols.

2. The method of claim 1, wherein adjusting the image of the code includes cropping the image to exclude extraneous background imagery.

3. The method of claim 1, wherein orienting the code includes identifying a main interval associated with a main axis and a secondary interval associated with a secondary axis, and wherein the main interval includes separation of the generally circular symbols by a first interval and the secondary interval includes separation of the generally circular symbols by a secondary interval that is shorter than the first interval.

4. The method of claim 1, wherein decoding the symbols includes locating at least one start identifier and at least one stop identifier, and decoding a grouping of the symbols between the at least one start identifier and the at least one stop identifier.

5. The method of claim 1, wherein the code includes extraneous symbols that are ignored during the decoding of the symbols at each grid location.

6. The method of claim 1, wherein adjusting the image of the code includes iterative threshold segmentation, the iterative threshold segmentation applied to a plurality of directional convolution kernels to turn gray portions of the image to a binary edge, the iteration stopping when a difference between a new threshold and an old threshold is less than a predetermined value based on a set number of pixels.

7. The method of claim 6, wherein the plurality of directional convolution kernels comprises filter matrixes associated with angles of 0, 45, 90 and 135 degrees.

8. A method of analyzing an image having a code, comprising:
determining a boundary of the code, the boundary circumscribing a pattern of a plurality of symbols that define the code, the plurality of symbols including a small dot having a first radius, a large dot having a second radius, the first radius being smaller than the second radius, and a ring having an inner radius substantially equal to the first radius and an outer radius substantially equal to the second radius;
performing binary segmentation of the code, the binary segmentation isolating a substantial portion of the plurality of symbols from a background of the image;
overlaying a grid through the plurality of symbols to provide an orientation of the code, the grid including intersecting lines at each symbol of the plurality of symbols; and
extracting the plurality of symbols at the intersecting lines, the extracted symbols configured for recognition and decoding of the plurality of symbols along the orientation.

9. The method of claim 8, further including determining a read direction of the plurality of symbols of the pattern, the read direction consistent with decoding the code.

10. The method of claim 9, wherein determining the read direction includes locating at least one start identifier and at least one stop identifier, and decoding a grouping of the plurality of symbols between the at least one start identifier and the at least one stop identifier.

11. The method of claim 8, wherein the plurality of symbols includes a plurality of a common geometrical shape in differing sizes and configurations.

12. The method of claim 8, wherein extracting the plurality of symbols includes comparing information associated with the plurality of symbols to a combination of a symbol area, a symbol boundary length, and a distribution variance.

13. The method of claim 12, wherein comparing information associated with the plurality of symbols further includes comparing gray level peaks detected during binary segmentation to distinguish the ring from the small dot or the large dot.

14. The method of claim 8, wherein determining the boundary further includes cropping the image to remove extraneous background imagery while preserving the code within the boundary.

15. One or more computer readable media comprising computer-executable instructions that, when executed by a computer, perform acts comprising:
processing an image to detect a code, the code including generally circular symbols arranged as a predetermined pattern, the generally circular symbols including a small dot having a first radius, a large dot having a second radius, the first radius being smaller than the second radius, and a ring having an inner radius substantially equal to the first radius and an outer radius substantially equal to the second radius;
orienting the code with respect to the image, the orienting including identifying a first interval associated with a first axis and a second interval associated with a second axis, the first interval including separation of the generally circular symbols by the first interval, and the second interval including separation of the generally circular symbols by the second interval, the second interval being shorter than the first interval;
manipulating the code to locate the symbols in the pattern, each symbol located at a position along an interval in the pattern, the manipulating including iterative threshold segmentation, the iterative threshold segmentation applied by operation of a plurality of directional convolution kernels to turn gray portions of the image to a binary edge, the iteration stopping when a difference between a new threshold and an old threshold is less than a predetermined value based on a set number of pixels;
recognizing the symbols at each interval position; and
decoding the pattern to create a message, the decoding including comparing a group of the symbols to an error checking column of symbols.

16. One or more computer readable media as in claim 15, wherein the symbols are symmetric symbols.

17. One or more computer readable media as in claim 15, wherein the first interval and the second interval create a uniform grid that includes symbols at each intersection of rows and columns, each spaced apart by an interval associated with a respective axis.

18. One or more computer readable media as in claim 15 wherein decoding the pattern includes reading a grouping of the symbols in a first direction, the grouping of symbols associated along at least a portion of a second direction.

19. One or more computer readable media as in claim 15, wherein recognizing the symbols includes comparing information associated with the symbols to a combination of a symbol area, a symbol boundary length, and a distribution variance.

20. One or more computer readable media as in claim 15, wherein manipulating the code includes histogram normalization configured to adjust contrast in portions of the image.

* * * * *